ELIJAH CHITISTER, OF CHATHAM, IOWA.

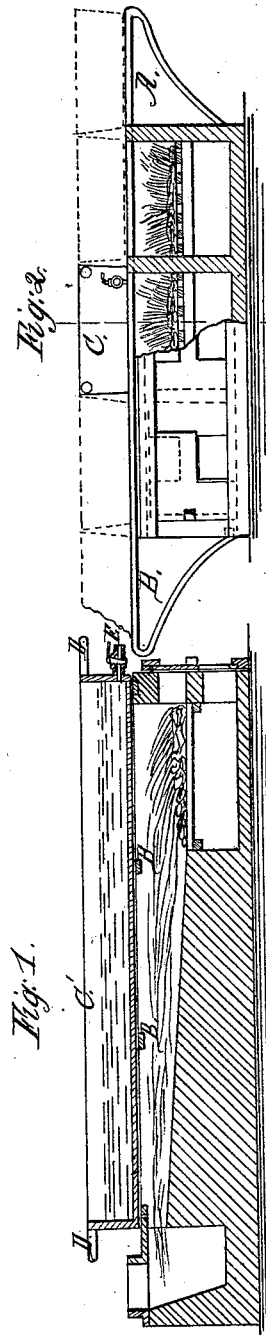

*Letters Patent No. 85,791, dated January 12, 1869.*

IMPROVED EVAPORATING-APPARATUS.

The Schedule referred to in these Letters Patent and making part of the same.

*To all whom it may concern:*

Be it known that I, ELIJAH CHITISTER, of Chatham, in the county of Buchanan, and State of Iowa, have invented a new and improved Evaporating-Apparatus; and I do hereby declare that the following is a full, clear, and exact description thereof, which will enable others skilled in the art to make and use the same, reference being had to the accompanying drawings, forming part of this specification.

This invention relates to improvements in apparatus for evaporating sorghum-juice and other similar substances.

It consists of a furnace arranged in three or more sections, and provided with ways for sliding the pans transversely over the furnace, and provided, also, with suitable pans, which, after being charged with the liquid to be evaporated, are placed over the furnace and transferred from one section to another, where fires of varying intensity are maintained, in the order calculated to produce the best results, as will be hereinafter described.

Figure 1 represents a longitudinal elevation of my improved apparatus, taken on the line $x\,x$ of fig. 2.

Figure 2 represents an end elevation of the same, with a part removed.

Similar letters of reference indicate like parts.

A represents a furnace, which I make preferably in three sections, open at the top, and provide with the transverse ways B.

C represents the pans, which I make of about the same size as the sections of the furnace, and I provide them with the strengthening-ribs of wood, C', arranged inside of the metallic sides of the pans, and projecting at the ends sufficiently to form handles.

They are also provided with cocks, E, for drawing off the sirup.

I have found that the best results are obtained, in evaporating sorghum-juice, by placing but a small quantity of juice in a pan, and exposing it to the action of a slow fire until it boils and the first skimmings rise, after which it is desirable to boil it as rapidly as possible until the sirup is formed, when it should again be exposed to a slow boil until the sirup is drawn off.

To carry out this plan, I have provided the above-described arrangement, and operate it by running the fresh juice from the mill into a pan in the side of the furnace, which may be shoved in the ways over the slow fire, from which, at the proper time, it may be passed on to the middle or hottest fire, and another pan of fresh juice placed on the first fire, and again, after being submitted to the hot fire a proper length of time, it may be passed on to the third and slower fire, and the second pan moved to the second fire, while a fresh one is placed on the first. From the last fire the pan may be removed entirely to the extended part of the ways B, and the product removed preparatory to returning the pan to the original position for receiving a fresh supply and repeating the operation.

In this manner the heat may be regulated to the changed condition and demands of the juice or sirup, and the process is made continuous, and results in producing a better article and a more economical process.

Having thus described my invention,

I claim as new, and desire to secure by Letters Patent—

1. The sectional furnace A, provided with the transverse ways B, and arranged for passing the series of pans C from one section of the furnace to the other, substantially as and for the purpose set forth.

2. The pans C, provided with the strengthening-ribs C', terminating in the handles D, substantially as and for the purpose described.

3. The method herein described, of evaporating sorghum or other juice by the employment of a series of pans and a sectional furnace, having the fires arranged in the order substantially as set forth.

ELIJAH CHITISTER.

Witnesses:
H. J. WHITE,
N. A. BASSETT.